(12) United States Patent  
Morrow

(10) Patent No.: US 6,334,368 B1
(45) Date of Patent: Jan. 1, 2002

(54) MULTI-PATH GEAR SETS WITH LOAD SHARING BETWEEN PATHS

(75) Inventor: William Bruce Morrow, Santa Barbara, CA (US)

(73) Assignee: Harrier Technologies, Inc., Greenwich, CT (US)

( * ) Notice: Subject to any disclaimer, the term of this patent is extended or adjusted under 35 U.S.C. 154(b) by 0 days.

(21) Appl. No.: 09/572,825

(22) Filed: May 17, 2000

(51) Int. Cl.⁷ .................. F16H 37/06; F16H 57/12; F16H 55/14
(52) U.S. Cl. ........................................ 74/410
(58) Field of Search ............... 74/22 A, 22 R, 74/27, 74, 89.26, 89.27, 664, 665 R, 352, 397, 401, 409, 410, 411, 413, 432

(56) References Cited

U.S. PATENT DOCUMENTS

| | | | | |
|---|---|---|---|---|
| 2,655,050 A | * | 10/1953 | Divette et al. ............... 74/409 |
| 3,772,934 A | * | 11/1973 | Warren ................... 74/410 X |
| 3,802,293 A | * | 4/1974 | Winckler et al. ............ 74/745 |
| 3,824,875 A | * | 7/1974 | Willert et al. ............ 74/410 X |
| 4,458,551 A | * | 7/1984 | Winter-Peter ............ 74/473.21 |
| 4,612,816 A | * | 9/1986 | Chalik ...................... 74/409 X |
| 4,641,543 A | * | 2/1987 | Jessup ........................ 74/410 |
| 4,709,590 A | * | 12/1987 | Richards ................. 74/410 X |
| 4,730,788 A | * | 3/1988 | Metcalf et al. .......... 74/410 X |
| 4,803,896 A | * | 2/1989 | MacGregor ............... 74/606 R |
| 5,385,066 A | * | 1/1995 | Braun ......................... 74/331 |
| 5,927,147 A | * | 7/1999 | Morrow ..................... 74/410 |
| 6,053,840 A | * | 4/2000 | Jones ........................ 475/338 |
| 6,122,985 A | * | 9/2000 | Altamura ................ 74/410 X |
| 6,189,397 B1 | * | 2/2001 | Morrow ..................... 74/410 |

FOREIGN PATENT DOCUMENTS

GB 2079877 A * 1/1982

* cited by examiner

Primary Examiner—David Fenstermacher
Assistant Examiner—Colby Hansen
(74) Attorney, Agent, or Firm—Dennis B. Haase, Esq.

(57) ABSTRACT

A direct drive transmission for delivering relatively large power values from a power source relative to its size, wherein an input shaft and an output shaft are drivingly engaged by intermediate shafts of varying lengths, and further in which helically cut gears and pinions having limited freedom to move axially of the shafts which support them are provided at least at the input side of the transmissions to facilitate the balancing of the loads being transmitted by the intermediate shafts.

8 Claims, 2 Drawing Sheets

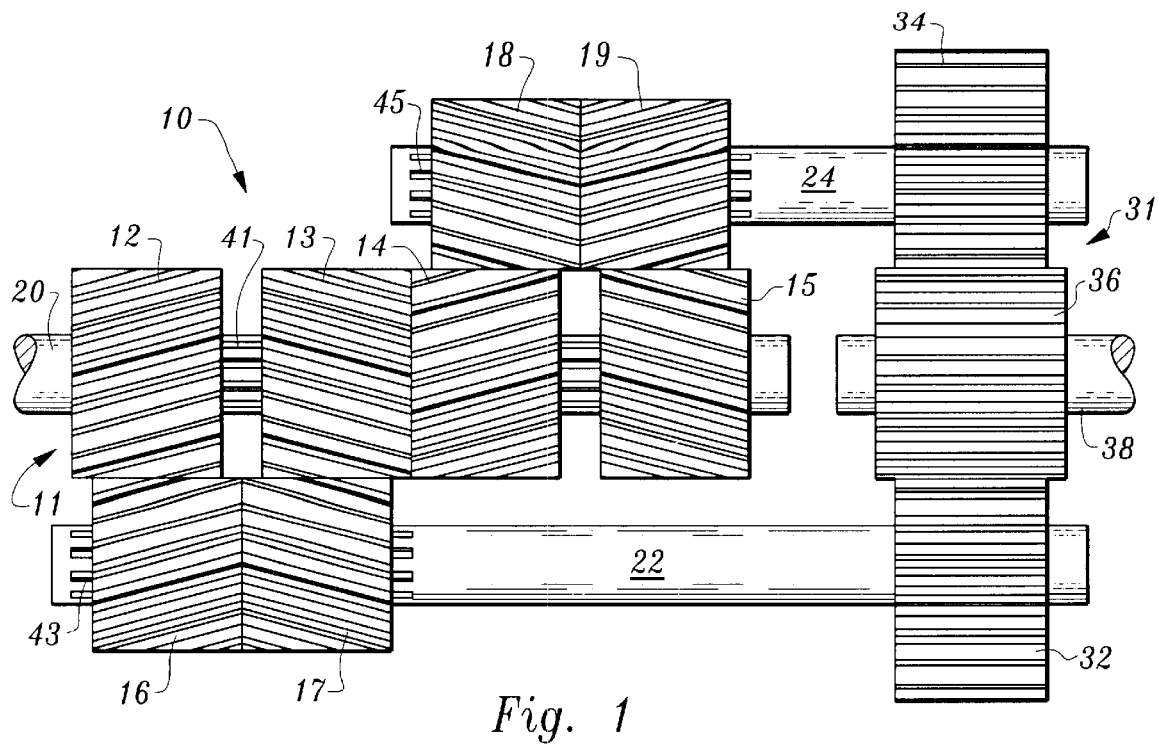
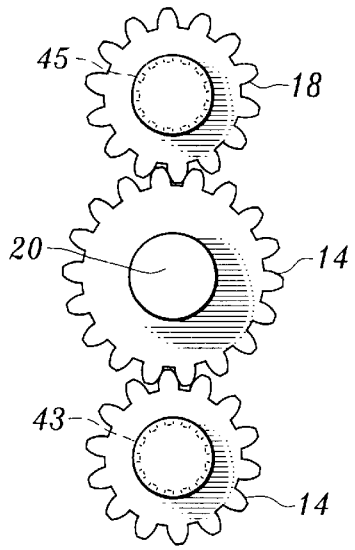
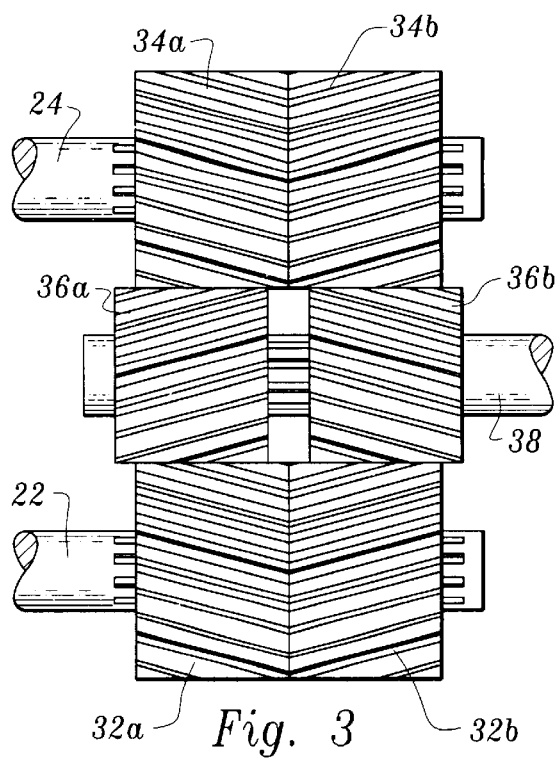

MULTI-PATH GEAR SETS WITH LOAD SHARING BETWEEN PATHS

The present invention relates generally to a direct drive transmission in which multiple power paths are used to divide and transmit input power to an output, and, more particularly, such a transmission in which helical gears interconnect such power paths in a manner which results in a balancing of loads on such power paths.

BACKGROUND OF THE INVENTION

1. Field of the Invention

The power transmission industry is constantly seeking ways to transmit large loads through dimensionally small systems. However, in the absence of the use of exotic, high cost alloys, the design and construction of direct drive transmissions are often predetermined as to size by virtue of the particular application, loads transmitted, and cost. Accordingly, a given transmission is inevitably limited as to the load they can effectively transmit for any particular application. Larger loads typically entail larger gears, and if, e.g., a transmission is to be positioned in a well casing, its size is predetermined by its environment, and its capacity to deliver a required load to a driven element such as a pump, is likewise limited.

It is recognized that one way to reduce the overall size of the transmission is to divide, or split, the load carrying capacity of any given system into multiple paths defined by smaller load carrying elements, which would then permit a reduction in the size of the gears needed per element to transmit a design load. Then, by select spacing and positioning of the elements, the overall size of the spacing transmission is capable of being reduced.

It is equally recognized, however, that when multiple load carrying elements are receiving power from an input source for delivery to an output, whether it be in a step up or step down mode, there is an opportunity, indeed, likelihood, for imbalance between such load carrying elements.

Any such imbalance tends to accentuate wear and create an imbalance at the output end, even creating damaging harmonics, all of which greatly accelerate maintenance costs, and consequent down time, which tends to compromise, if not utterly defeat, the value of dividing the input power.

In summary, it will be appreciated that an unbalanced application of power, wherever it may occur in a transmission, inevitably results in uneven wear in the gearing and cyclic, or otherwise erratic, power output which, if not quickly ameliorated, will exacerbate the damage to the transmission itself, as well as any equipment to which it is drivingly connected.

2. Overview of the Prior Art

The concerns addressed by the present invention are not particularly new, although the solution offered herein is believed novel. Others have attempted to formulate a solution, including Mr. Morrow in his recently issued U.S. Pat. No. 5,927,147, which addresses and successfully resolves, gear loading problems in a single path gear train configuration. Schmitter (U.S. Pat. No. 2,654,267) utilized the power sharing ability of the dual helical gearing arrangement to allow a dual path drive with balanced load. That is, power input at gear 11 is split between intermediate pinions 15 and 16, which drive via dual bevel gears, and intermediate driven helical gears 39 and 40, which drive output helical pinions 45 and 46. Output pinions 45 and 46 have opposite helical angles and are mounted on an output shaft 47 which has limited axial movement. Axial movement of the output shaft is intended to provide balanced loading to the driven element connected thereto.

In a similar operating arrangement, Wallgren (U.S. Pat. No. 2,982,144) utilizes the characteristics of dual helical gearing wherein the driving dual helical gear pair is mounted on a drive shaft for limited axial movement to achieve balance load between two intermediate pinion shafts driving a single output gear.

In Whateley (U.S. Pat. No. 4,065,981) axially aligned input and output shafts are connected by helical gearing on intermediate shafts, and a dual helical arrangement on the output shaft is mounted for axial movement to provide balanced power to the output shaft.

Chung (U.S. Pat. No. 4,056,018) suggests a variation on the theme by providing additional intermediate shafts, 88 and 88', equipped with dual helical pinions, 94 and 94', that further drive four intermediate shafts, 96, 96', 98 and 98', finally driving a single driven pinion 30 via gears 108, 108', 110, and 110'.

While there is prior art, each offering a variation directed to balancing loads on gears via the use of the load sharing characteristics of a dual helical gear set mounted on a shaft with limited axial movement, all share two serious limitations. A dual helical arrangement allows only one gear mesh for each of the two driven pinions, thereby limiting the input or output to that specific load capable of being transmitted by one gear. Since the drive pinions are single helical cut gears, a thrust load will be transmitted to the pinion shaft whenever load is carried by the pinion. This thrust load must be accommodated by the added expense of providing thrust bearing of some nature.

As will become apparent from a further reading of the following detailed description of a preferred embodiment, it will be appreciated that the invention taught herein represents a significantly and uniquely different approach to accomplishing load distribution in direct drive transmissions which are relatively small in size, yet capable to transmitting relatively large loads.

SUMMARY OF THE INVENTION

Having explored the environment in which the present invention has particular, although perhaps not exclusive, utility, it will now be appreciated that the geared transmission of the type addressed herein comprises, in one form, one or more pairs of helical gear sets, typically on parallel shafts, in operative engagement with a power input source and capable of delivering relatively great power therefrom, relative to its physical size, in a uniform balanced manner to the transmission output.

Clearly, therefore, a principal objective of the present invention is to provide a transmission of the type having a power input and pairs of intermediate elements engaging the input to split the power therefrom and deliver that power in a uniform and balanced manner to the transmission output.

A further objective incident to the foregoing, is to provide such a transmission which can deliver significant power from a single source to a driven member in an efficient and economical manner with minimal wear and tear on relatively standard, as distinguished from exotic, components which define the transmission and to accomplish this in a package which is smaller than would otherwise be anticipated, given the load parameters.

Another objective is to provide a transmission of the type having a power input and pairs of intermediate elements engaging the input to uniformly split the power, while providing much greater load capacity than heretofore possible.

A still further objective is to provide such a transmission wherein, during the transmission of power, all thrust loads on all gears, pinions and shafts are balanced. While the foregoing delineates several significant and practical objectives attainable by the structure of the invention, no effort has been made to articulate all of the objectives that are met by the gear set of the present invention, and others will become apparent to those skilled in the art as the forthcoming description of a preferred embodiment is studied, in conjunction with the appended drawings, wherein:

DESCRIPTION OF THE DRAWINGS

FIG. 1, illustrates, in side elevation, a simple direct drive transmission wherein the casing is cut away to illustrate the operative gear train, and wherein intermediate drives deliver the power from the power input gears to the output shaft, while achieving balanced loading between the intermediate drives;

FIG. 2 is a left end pictorial view of the transmission gear set of FIG. 1.;

FIG. 3 is a side elevation of portion of a transmission similar in configuration to that shown in FIG. 1, but illustrating a dual helical output gearing configuration rather than the spur gear output gear set shown in FIG. 1.

DESCRIPTION OF A PREFERRED EMBODIMENT OF THE INVENTION

Figure 4:
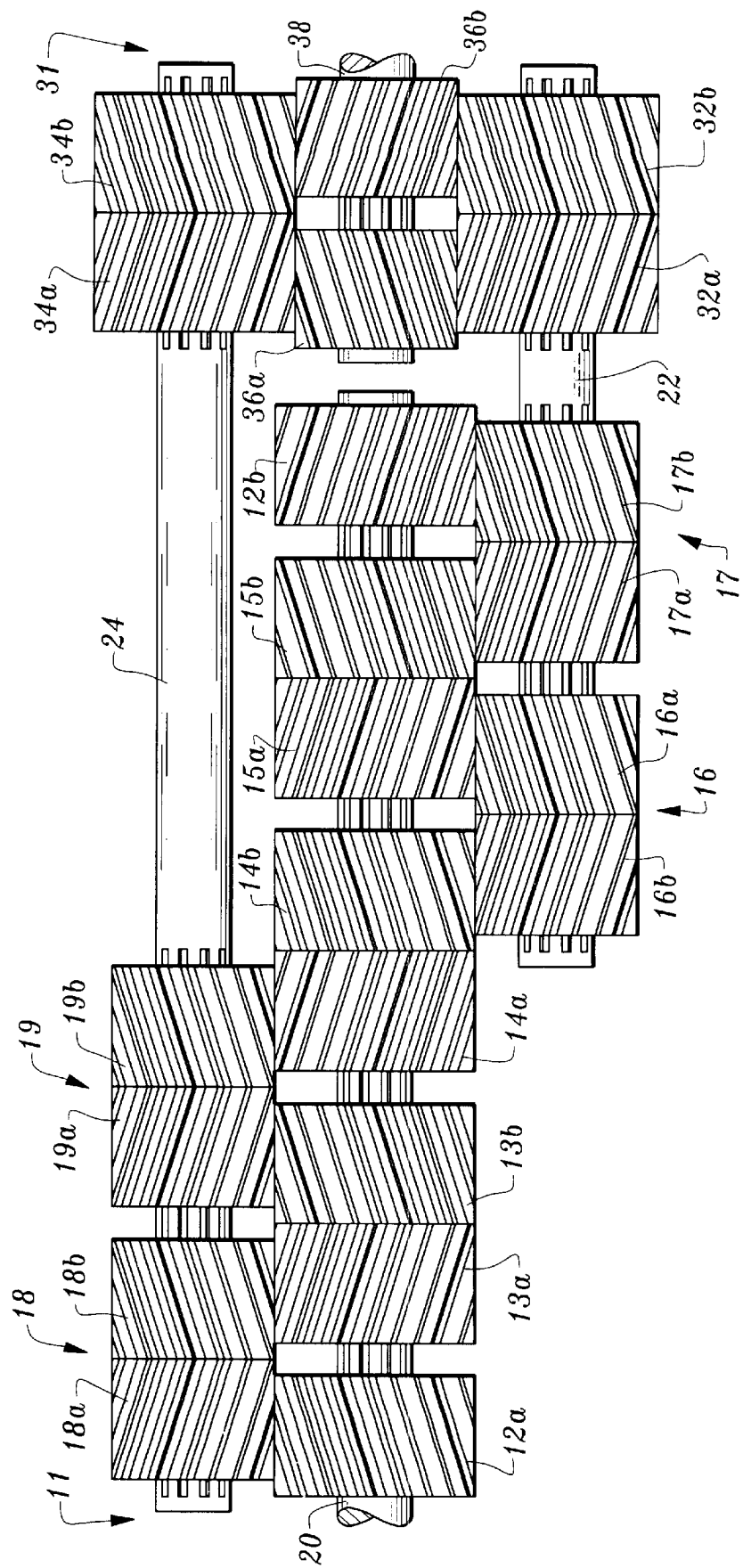
FIG. 4, is a side elevation of the transmission of the type shown in FIG. 1, with an input gear set comprising multiple gear pairs on the input shaft, with each intermediate shaft carrying multiple driven pinions, and further having a dual helical output gear set.

With reference now to the drawings, and initially to FIG. 1, a direct drive transmission 10 is depicted in side elevation with the casing cut away in order to permit a full view of the drive train. The configuration of this gear train typifies one of several such gear trains which are particularly adapted to facilitate the transmission of relatively high loads with off the shelf type gearing and shafts, by presenting multiple power paths to the output of the transmission, thereby permitting the overall size of the transmission to be greatly reduced so that it readily fits in highly dimensionally restrictive environments.

The transmission of FIG. 1 is characterized as having a power input gear set 11 comprised of, in this instance, four helically cut gears 12, 13, 14 and 15, serially spaced, and mounted for rotation on input shaft 20. A power source to provide input power through the input shaft is not illustrated herein since power may be derived from any one of several well known power generating devices.

In keeping with the objectives of the invention, power into the shaft 20 is transmitted through the helical gears 12, 13, 14 and 15, where it is delivered to intermediate driven shafts 22 and 24.

Delivery is accomplished by the intermeshing of the input helical gears with a plurality of companion intermediate driven pinions 16, 17, 18, and 19, each having helical teeth formed thereon. As will be appreciated from a reference to FIG. 1, pinions 16 and 17 are mounted on shaft 22, and, in a corresponding fashion, pinions 18 and 19 are mounted on shaft 24.

Reference to FIG. 2 will assist in the visualization of the interrelationship of the shafts, although it will again be appreciated that the precise relative locations of the shafts are the product of design parameters.

Still referring to FIG. 1, helical pinions 16 and 17 have identical pitch diameters, and equal but opposite helical angles, and are aligned and engaged with helical drive gears 12 and 13. Similarly, helical pinions 18 and 19 have the same pitch diameter, and equal but opposite helical angle orientation as pinions 16 and 17, and are aligned and engaged with drive gears 14 and 15. Adjacent pairs of intermeshed gears and pinions define a herringbone pattern when viewed in side elevation.

In the ideal case, where all of the teeth on the gears and pinions are identically hobbed, or otherwise formed, the power transmitted between intermeshed pairs would be substantially identical. As is well known, however, ideal conditions are but an illusion in the industrial setting, and normal manufacturing tolerances are such that variations in one or more of the dimensions is inevitable.

Power into the transmission from the shaft 20 is transmitted to the intermediate jack shafts 22 and 24, which in this example, operate as a pair. As may be observed in the drawings, the intermediate shafts are of differing lengths, which aids in reducing the overall diameter of the transmission.

In order that the power from the input shaft 20 can be uniformly delivered to the driven element connected to the transmission, an output gear set 31 is provided, which in the illustrated case, comprises intermediate pinions 32 and 34 secured, in any suitable fashion, to the intermediate jack shafts 22 and 24, respectively, for rotation therewith.

The intermediate, or output, pinions 32 and 34 on the jack shafts 22 and 24 are so positioned as to be properly aligned and fully engaged with the output gear 36 of the transmission, disposed for rotation with the output shaft 38. In the illustrated case the output pinions and gears have straight teeth which are co planer with the axis of the shafts upon which they are mounted, thus defining spur gears.

In order to accomplish the purpose of the invention to overcome the deficiencies that are inherent in the manufacturing process, uniformity of loading is accomplished by providing for the limited axial movement of selected gear elements. Continuing with reference to the FIG. 1 embodiment, input gears 12 and 15 are fixedly mounted on input drive shaft 20, while gears 13 and 14 are mounted on shaft 20 for limited axial movement, which is readily accomplished by means of a spline 41, although it will be clearly understood that alternative methods which would permit axial movement of the selected gears while allowing those gears to be driven rotationally by shaft 20, are within the contemplation of the invention.

Likewise, pinions 16 and 17 are mounted on intermediate shaft 22 by spline 43, and pinions 18 and 19, are splined as at 45, on intermediate shaft 24, again it being understood that other means providing freedom of axial movement while allowing the pinions to be rotationally driven on their respective intermediate shafts are within the contemplation of the invention.

The practical purpose, of course, of splitting the input power between intermediate drive shafts 22 and 24 is to permit optimization of the size of the drive pinions, thereby permitting the overall size of the transmission to be smaller than might otherwise be anticipated given the value of the power input.

When input loads are divided among intermediate shafts, a need arises to balance those loads so as to minimize wear and consequent maintenance, the result of which is costly down time.

Balance, however is not easily achieved. By virtue of disparate manufacturing tolerances and procedures, it is not always the case that the power is split evenly between the input pinions and, as is well understood in the art, dimensional differences in the dedendum, addendum, root and pitch circles and the like, between companion pinions 16, 17, 18, and 19 will contribute, to a greater or lesser degree, to a disparity in the load carried by a particular pinion.

In order, therefore, to permit the balancing of loads on and between intermediate drive shafts 22 and 24 and, hence, even loading of output pinions 32 and 34, the gearing configuration 11 at the input end of the transmission, it is an attribute of the present invention that selected ones of said input pinions are mounted for limited axial movement.

Assuming, by way of illustration, that the input drive rotational direction in FIG. 1 is counterclockwise, when the transmission is placed under load the helical gears will experience an axial thrust in response to the torque load, such that drive pinions 13 and 14 and pinions 16, 17 and 18, and 19 are pushed toward one another, such that the aforesaid meshed cooperating pairs of gears and pinions act in concert. For gears with equal helical angles and pitch radii, the magnitude of the axial thrust a gear exerts is directly proportional to the torque being experienced by that gear. If, for example, pinion pair 16, 17, due to manufacturing tolerances, is more heavily loaded than pair 18, 19, the axial thrust to the right of pinion 16 away from fixedly attached gear 12 will be greater than the axial thrust to the left of pinion 19 away from fixedly attached gear 17. This imbalance causes pinion pair 16, 17 to move to the right. As pinion pair 16, 17 moves to the right, pinion 17 more fully engages gear 13, causing gear pair 13, 14 to also move in response to the right. As gear pair 13 and 14 moves to the right, gear 14 is pushed into more forceful engagement with pinion 18, causing pinion pair 18, 19 to accept more torque load. This balancing of axial forces will continue until all gears and pinions are in static axial balance, where no further axial movement occurs.

Since axial forces are proportional to torque forces, when the gear train is in axial static balance, it is also in torque load balance. When pinion pairs 16, 17 and 18, 19 are in torque load balance, the load transmitted by intermediate shafts 22 and 24 is also in balance, and, hence, the loads driven gears 32 and 34 exert on driven pinion 36 are balanced, and the output will be uniform and smooth.

Another characteristic of the gear train shown in FIG. 1 is that despite the extensive use of helical gears, there are no unbalanced axial thrust forces. Gears and pinions that are capable of limited axial movement are always paired and push toward one another with an equal but opposite force when the gear train is in load balance. The other two gears, 12 and 15, are fixedly attached to shaft 20 and also experience equal but opposite thrust, such that there is no net axial forces on shaft 20.

It will be appreciated that while spur gears have been illustrated on the output side of the transmission, helical gears, or any other gear type suitable to cause the driving of output shaft 36, may be employed, since the loading on the output side is already balanced at the intermediate jack shaft gear sets.

FIG. 3 shows such an alternative output gear arrangement, where the output gears and pinions are of a dual helical configuration. Thus, the output pinion 32, which is a spur gear, is replaced by split helical gear pairs 32a and 32b, which are splined to intermediate shaft 22 and form the now familiar herringbone pattern. Similarly, pinion 34 becomes helical pinion pair 34a and 34b, again forming the familiar herringbone pattern. These pinions mesh with output gear 36, which is split into gears 36a and 36b, all of which mesh together to complete the drive to shaft 38.

As will now be illustrated, the present invention is not restricted to the FIG. 1 configuration. In reference now to FIG. 4, the transmission configuration there shown is, in accordance with the invention, provided with twice the number of input gears as shown in FIG. 1.

Specifically, input shaft 20 is fitted with several drive gears, in this instance eight helical cut driving gears, engaged and driving intermediate shafts 22 and 24, which are, respectively, equipped with four drive pinions each. In this configuration, several intermediate shafts may be employed without departure from the invention.

Thus, input drive gears 13a and 13b, 14a and 14b, 15a and 15b are splined to the input shaft 20 to permit limited axial movement, while meshing respectively with pinions 18a and 18b, and 19a and 19b, on the one hand, and 16a and 16b and 17a and 17b on the other. These pinions are, likewise, splined, respectively, to intermediate shafts 22 and 24. Input drive gears 12a and 12b are fixed with respect to shaft 20 and are immovable except with the shaft 20.

On the output side, gear set 31 is entirely made up of helical cut gears, and the pinions 32a and 32b, and 34a and 34b are splined, whereas the gear halves 36a and 36b are not. Functionally, the gears and pinions respond in the manner previously described.

Such a configuration would be useful where a transmission is required to transmit exceptionally large loads and must fit in a space that is more limited in lateral than in longitudinal dimension.

It will be appreciated that there are other direct drive transmission configurations which would benefit from the novel load balancing apparatus illustrated herein, without departure from the invention. It will also be appreciated that the load balancing characteristics of the transmission are undiminished if the power input comes from the other side of the transmission, i.e., the input side becomes the output side. In such a case, a step up transmission will become a step down transmission.

Having now described a preferred embodiment of the invention as it will enhance the reliability and useful life of many direct drive transmissions, irrespective of the tooth configuration of the gears.

What is claimed is:

1. In a direct drive transmission for transmitting large loads relative to its size, having:

a power input shaft; a power output shaft;

intermediate shafts disposed between said power input shaft and said power output shaft, and being in driving engagement with each;

a plurality of input gears supported in rotational driving relation on said input shaft, said input gears having helically cut teeth formed thereon such that said teeth on adjacent said input gears being formed at a helical angle that is equal to but opposite that of its said adjacent input gear;

a plurality of pinions, said pinions being rotationally drivingly attached to said intermediate shafts, helically cut teeth formed on said pinions, said pinions being in driving engagement with adjacent gears on said input shaft;

output gear on said output shaft, said output gear being mounted to said output shaft for rotation therewith;

output pinions, said output pinions mounted to said intermediate shaft, and being in driving engagement with said output gear; and at least some of said helically cut pinions and said helically cut gears being mounted for limited axial movement relative to said intermediate shafts and said input shaft to which they are mounted.

2. The transmission as set forth in claim 1, wherein said input shaft and said intermediate shafts are splined so as to permit said pinions and said gears mounted thereon may move axially by a predetermined amount.

3. The transmission as set forth in claim 1 wherein said intermediate shafts are of different lengths.

4. The transmission as set forth in claim 3, wherein said output pinions are mounted to said intermediate shaft so as to have limited axial movement relative thereto.

5. The transmission as set forth in claim 1, wherein said output pinions and said output gear in driving engagement therewith have teeth formed thereon which are straight, and co planer with said shafts upon which each is mounted.

6. The transmission as set forth in claim 1, wherein said output pinions are formed with helically cut teeth, said teeth on adjacent ones of said output pinions defining a herringbone pattern;

said output gear comprising a pair of gear halves, said halves having helically cut teeth, said teeth together defining a herringbone pattern such that said output gear and said output pinions are intermeshed in driving engagement.

7. The transmission as set forth in claim 1, wherein said input shaft, said output shaft, and the intermediate shafts that interconnect said input shaft and said output shaft in power transmitting relation are parallel.

8. The transmission as set forth in claim 1, wherein said intermediate shafts are co planer.

\* \* \* \* \*